No. 699,494. Patented May 6, 1902.
F. J. DEL CORRAL.
RAISIN SEEDER.
(Application filed Dec. 31, 1897.)
(No Model.) 2 Sheets—Sheet 1.
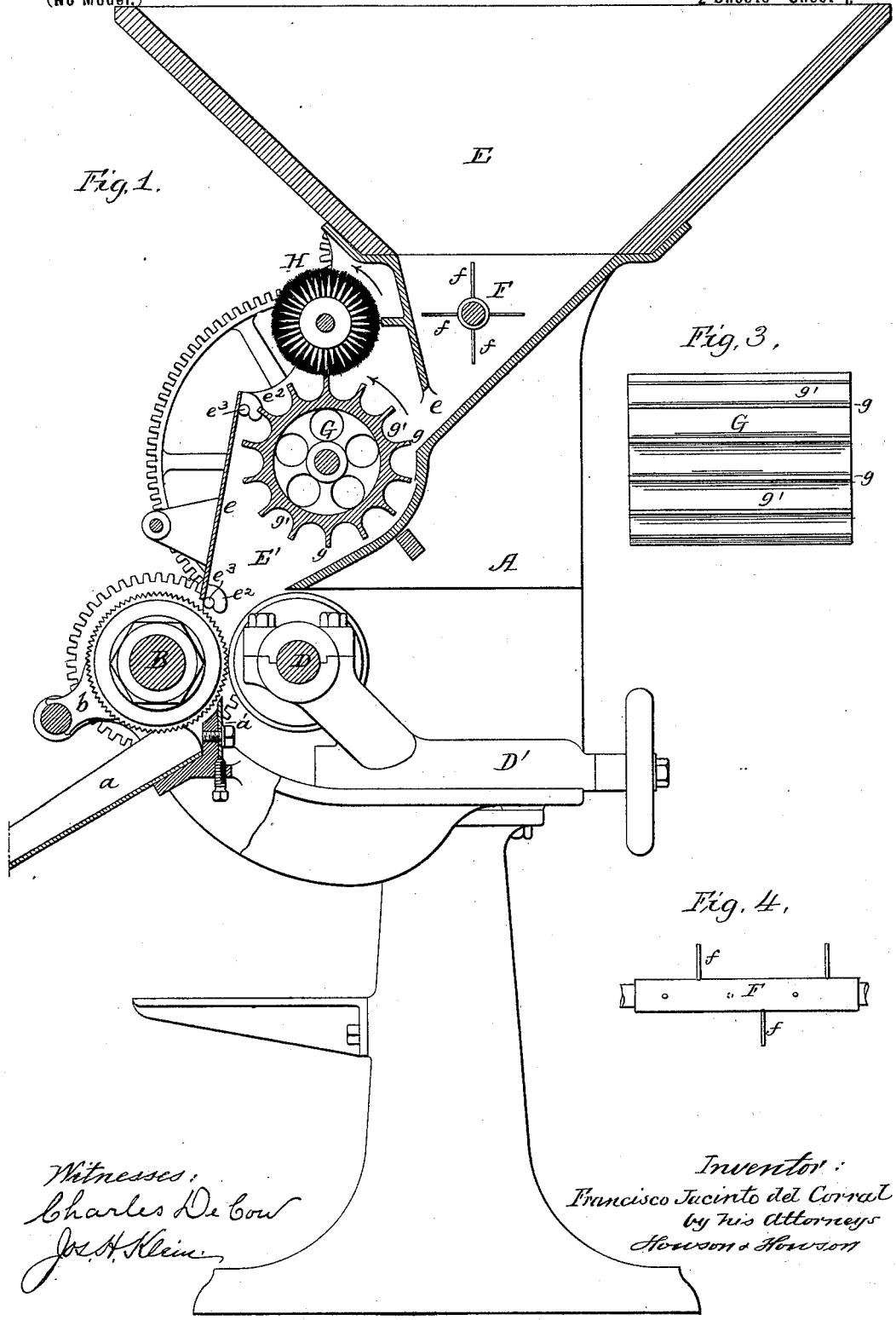
Witnesses:
Charles De Cow
Jos. H. Klein
Inventor:
Francisco Jacinto del Corral
by his Attorneys
Howson & Howson

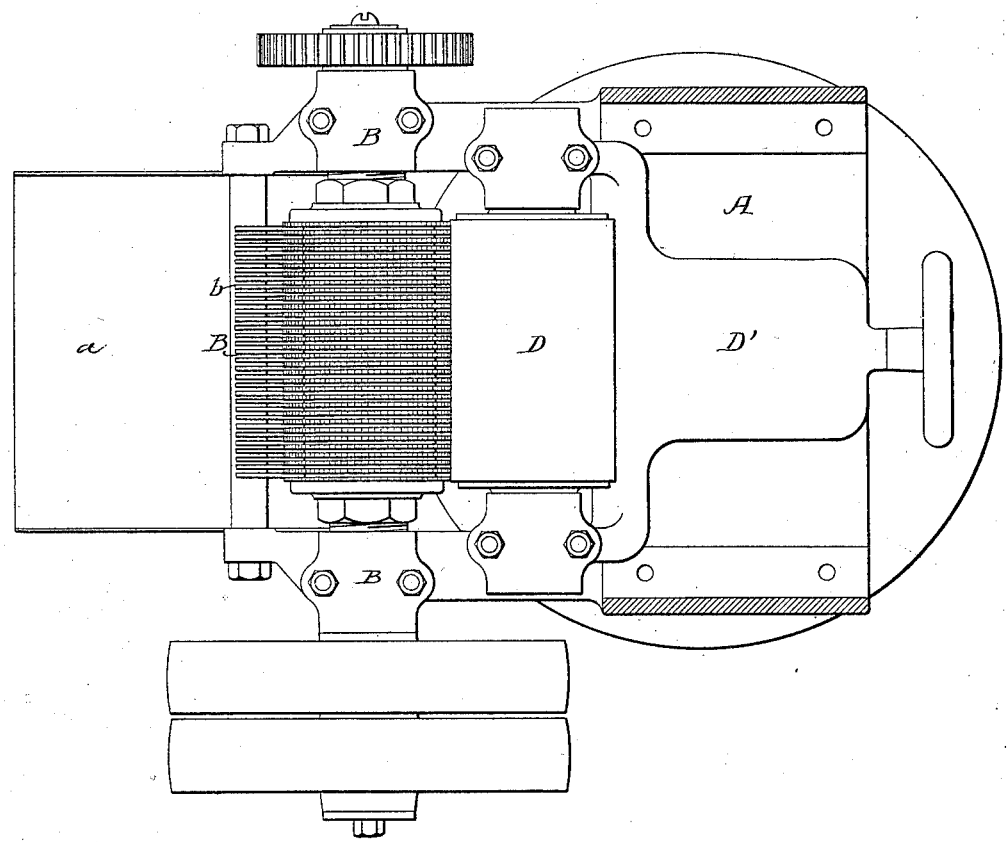

UNITED STATES PATENT OFFICE.

FRANCISCO JACINTO DEL CORRAL, OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

RAISIN-SEEDER.

SPECIFICATION forming part of Letters Patent No. 699,494, dated May 6, 1902.

Application filed December 31, 1897. Serial No. 665,022. (No model.)

*To all whom it may concern:*

Be it known that I, FRANCISCO JACINTO DEL CORRAL, a citizen of the United States, residing in Philadelphia, Pennsylvania, have invented certain Improvements in Raisin-Seeders, of which the following is a specification.

My invention relates to certain improvements in raisin-seeders in which the raisins to be seeded are passed between two rolls, one roll of yielding material and the other having projections, so that the projections force the seeds from the meat of the raisins.

My invention relates to the mechanism for feeding the raisins to this class of mechanism, so that the raisins will be presented in given quantities to the seeding mechanism.

In the accompanying drawings, Figure 1 is a sectional elevation of a seeding-machine made in accordance with my invention. Fig. 2 is a sectional plan view. Fig. 3 is a detached view of the feeding-roll, and Fig. 4 is a detached view of the agitating-shaft.

A is the frame of the machine, having bearings for the two rolls B and D. The roll B in the present instance is made up of a series of toothed disks properly spaced, while the roll D has a yielding face of rubber in the present instance. The roll D is mounted on a slide D' and can be adjusted from and toward the roll B.

$a$ is a chute for the meat of the raisin, and $a'$ is a blade for removing the seeds from the face of the roller B. The meat is moved from the roll B by means of blades $b$.

The mechanism described forms no part of my invention and is covered by a separate application for Letters Patent.

E is a hopper in which the raisins to be seeded are placed in quantities. This hopper at its lower end is shaped as shown in Fig. 1 and has an outlet $e$ at one side. The bottom of the hopper extends down past the opening and under the carrier and to a point directly above the roll D. The extension is curved, as shown, so that it will conform to the carrier. Within the lower portion of the hopper is a shaft F, having staggered arms $f$, and this shaft is rotated so that the arms will break up the clinging masses of raisins that are placed in the hopper. At the mouth of the hopper is a revolving carrier G, having ribs $g$ extending the full width of the carrier, and these ribs form pockets of a sufficient depth to hold a series of raisins side by side, but are not deep enough to hold two layers of raisins one above the other. The carrier revolves in the direction indicated by the arrow, Fig. 1, lifting the raisins up, so that the surplus raisins will fall back, and in the event of the carrier picking up more than one layer of raisins a brush H is provided, which extends across the carrier and so adjusted that in its rotation in the direction of its arrow it will remove the surplus raisins from the carrier, thus leaving a single row of raisins in each groove of the carrier, and as the carrier turns a single row of raisins will fall into the space between the rolls, and as they pass through the rolls they will be seeded. This prevents the mangling of the raisins when seeded in quantities. The front plate $e'$ of the chute E' between the carrier and the rolls is in the present instance made detachable and has lugs $e^2$, adapted to pins $e^3$ on the casing, so that the plate can be readily removed, so that access may be had to the space E'.

The shaft B is the main driving-shaft, having fast and loose pulleys, and this shaft is geared to the carrier-shaft by means of gear-wheels so proportioned that the carrier will feed practically a continuous stream of raisins to the seeding mechanism. The brush and the breaker-shaft F are also driven through the gearing from the carrier-shaft.

I claim as my invention—

1. The combination in a raisin-seeder, of a hopper, agitating mechanism comprising a shaft with a series of arms located therein, a rotating carrier mounted at the mouth of the hopper, the inclined bottom plate of the hopper being curved so as to extend under the carrier and in close proximity thereto, said carrier having longitudinal grooves for the reception of the raisins, a brush serving to remove the surplus raisins from the carrier mounted above and in close proximity thereto, means for rotating the brush the carrier and the agitating mechanism simultaneously, with seeding mechanism arranged below the carrier to which the raisins are fed, said mechanism comprising a seeding-roll driven with the rest of the mechanism and a yielding pressure-roller engaging the seeding-roller and receiving its movement from the same, said pressure-roller being adjustable from and toward the seeding-roll.

2. The combination in a raisin-seeder, of the toothed or serrated seeding-roll, a yielding pressure-roller in engagement with the seeding-roll and adjustable from and toward the same, a frame in which said rolls are mounted, a hopper having an inclined bottom with a curved extension connected thereto also carried by the frame, an outlet in the front of the hopper at the bottom leading to the seeding mechanism, a longitudinally-grooved carrier mounted in bearings in the frame and arranged within the hopper above said opening and adjacent to the curved extension of the bottom plate, a detachable front plate extending from the seeding-roll to a point in front of the carrier, said plate forming with the extension of the hopper-bottom a chute, a rotating clearing-brush mounted above the grooved carrier, a shaft with projecting fingers mounted within the hopper and serving to separate the raisins placed therein, and means for driving the agitating mechanism carrier-brush and seeding-roll simultaneously, so that the raisins may be fed continuously to the seeding mechanism, the pressure-roller being driven by its engagement with the seeding-roll and being adjustable from and toward the same to operate upon raisins of different size.

In testimony whereof I have signed my name to this specification in the presence of two subscribing witnesses.

FRANCISCO JACINTO DEL CORRAL.

Witnesses:
   WILL. A. BARR,
   JOS. H. KLEIN.